(12) United States Patent
Lin et al.

(10) Patent No.: US 7,840,082 B2
(45) Date of Patent: Nov. 23, 2010

(54) CODING METHOD AND SYSTEM WITH AN ADAPTIVE BITPLANE CODING MODE

(75) Inventors: Chun-Hung Lin, Hsinchu (TW); Tung-Hai Wu, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 746 days.

(21) Appl. No.: 11/896,962

(22) Filed: Sep. 7, 2007

(65) Prior Publication Data

US 2008/0063290 A1 Mar. 13, 2008

(30) Foreign Application Priority Data

Sep. 13, 2006 (TW) .............................. 95133817 A

(51) Int. Cl.
*G06K 9/36* (2006.01)
(52) U.S. Cl. ...................................... 382/236; 382/232
(58) Field of Classification Search ......... 382/232–253; 375/240.15
See application file for complete search history.

(56) References Cited

U.S. PATENT DOCUMENTS

| | | | |
|---|---|---|---|
| 2004/0190615 A1* | 9/2004 | Abe et al. .............. | 375/240.15 |
| 2005/0053296 A1* | 3/2005 | Srinivasan et al. .......... | 382/236 |
| 2006/0188019 A1* | 8/2006 | Lin ...................... | 375/240.16 |

* cited by examiner

*Primary Examiner*—Duy M Dang
(74) *Attorney, Agent, or Firm*—Bacon & Thomas, PLLC

(57) ABSTRACT

A coding method and system with an adaptive bitplane coding mode is provided to code multiple bitplanes of a frame consisting of multiple macroblocks. Each bitplane consists of macroblock modes used by the macroblocks of the frame. The method includes the steps of: (A) initializing a bitplane coding mode of the frame as a compress mode; (B) coding the frame and the bitplanes to thereby obtain coded bitplanes, and calculating the bit number of coded bitplanes; (C) calculating the bit number of uncoded bitplanes; (D) executing step (A) when the bit number of coded bitplanes is smaller than the bit number of uncoded bitplanes; (E) initializing the bitplane coding mode of the frame as a raw mode when the bit number of coded bitplanes is not smaller than the bit number of uncoded bitplanes.

12 Claims, 4 Drawing Sheets

CODING METHOD AND SYSTEM WITH AN ADAPTIVE BITPLANE CODING MODE

BACKGROUND OF THE INVENTION

1. Field of the Invention

The invention relates to the technical field of image coding and, more particularly, to a coding method and system with an adaptive bitplane coding mode.

2. Description of Related Art

An image coding typically compresses an entire frame by dividing the frame into macroblocks and compressing each of the macroblocks. To achieve a higher compression ratio, the macroblocks may be compressed by different macroblock modes, depending on the attributes thereof. Therefore, in a compressed or coded bit stream, each macroblock requires several fields to indicate the macroblock mode used in the macroblock, for example, Skipped MB/Not Skipped, 1MV/4MV, AC prediction, Direct Mode/Not Direct Mode, or the like. In the VC-1 standard, a bitplane coding mode is provided to further compress the macroblock mode of each macroblock to thereby achieve a higher compression ratio.

In the VC-1 (WMV) image coding, a frame is divided into multiple macroblocks, and the coding modes for every macroblock are combined into multiple bitplanes. Namely, each bitplane consists of macroblock modes used by a macroblock of the frame, and is coded in accordance with the VC-1 (WMV) image coding standard, thereby obtaining a preferred compression efficiency.

The bitplane coding mode can be divided into raw mode and compress mode. FIG. 1 is a schematic diagram of typical bitplanes of the coding system at the compress mode. As shown in FIG. 1, the macroblock modes output by a first macroblock mode determinator 120 and a second macroblock mode determinator 150 are temporarily stored in a second buffer 130. Having constructed multiple bitplanes, a compression operation is performed on the bitplanes. In addition, the compressed data of the macroblocks is temporarily stored in a first buffer 140. Finally, the compressed bitplane and the compressed macroblocks are combined into a bit stream. In this case, the combined bitplane is located in the frame header of the bit stream. FIG. 2 is a schematic diagram of typical bitplanes of the coding system in the raw mode. As shown in FIG. 2, each macroblock mode, which is not compressed, is temporarily stored in a second buffer 130. The non-compressed macroblock modes are combined with the compressed macroblocks. In this case, the data of each macroblock mode is located in the macroblock header of the macroblock corresponding to the macroblock mode. However, such a way requires a bit steam produced after every macroblock is temporarily stored and compressed, and the location of each compressed macroblock in the bit stream. In addition, the additional time for transferring data is required, which causes a poor efficiency. Therefore, there is a need to provide an improvement relating to coding method and system for the above bitplane coding mode.

SUMMARY OF THE INVENTION

An object of the invention is to provide a coding method and system with an adaptive bitplane coding mode, which can efficiently reduce the required memory space and the hardware cost.

Another object of the invention is to provide a coding method and system with an adaptive bitplane coding mode, which can save the operational time and increase the system speed.

In accordance with one aspect of the present invention, there is provided a coding system with an adaptive bitplane coding mode, which codes multiple bitplanes of a frame consisting of multiple macroblocks, each bitplane consisting of macroblock modes used by the macroblocks of the frame. The system includes a motion estimator, a first macroblock mode determinator, a discrete cosine transform (DCT) and quantization device, a second macroblock mode determinator, a variable length encoder and a raw mode determinator. The motion estimator receives the macroblock for performing a motion estimation. The first macroblock mode determinator is connected to the motion estimator in order to determine a macroblock mode of the macroblock in accordance with an output of the motion estimator. The DCT and quantization device is connected to the motion estimator and the first macroblock mode determinator in order to perform a DCT and quantization in accordance with an output of the first macroblock mode determinator. The second macroblock mode determinator is connected to the DCT and quantization device in order to determine the macroblock mode of the macroblock in accordance with an output of the DCT and quantization device. The variable length encoder is connected to the DCT and quantization device and the second macroblock mode determinator in order to perform a variable length encoding operation on the output of the DCT and quantization device in accordance with an output mode of the second macroblock mode determinator to thereby produce a macroblock bit stream. The raw mode determinator is connected to the first macroblock mode determinator and the second macroblock mode determinator in order to place each of the bitplanes associated with the macroblocks in a respective macroblock header when the raw mode determinator determines that the bitplane is a raw mode.

In accordance with another aspect of the present invention, there is provided a coding method with an adaptive bitplane coding mode, which codes multiple bitplanes of a frame consisting of multiple macroblocks. A bitplane consists of macroblock modes used by a macroblock of the frame. The method includes the steps: (A) initializing a bitplane coding mode of the frame as a compress mode; (B) coding the frame and the bitplanes to thereby obtain coded bitplanes, and calculating bit number of coded bitplanes; (C) calculating bit number of uncoded bitplanes; (D) executing step (A) when the bit number of coded bitplanes is smaller than the bit number of uncoded bitplanes; (E) initializing the bitplane coding mode of the frame as a raw mode when the bit number of coded bitplanes is not smaller than the bit number of uncoded bitplanes; (F) coding the frame, and re-calculating the bit number of uncoded bitplanes; (G) re-calculating the bit number of coded bitplanes; and (H) executing step (E) when the bit number of coded bitplanes is not smaller than the bit number of uncoded bitplanes after the recalculation.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
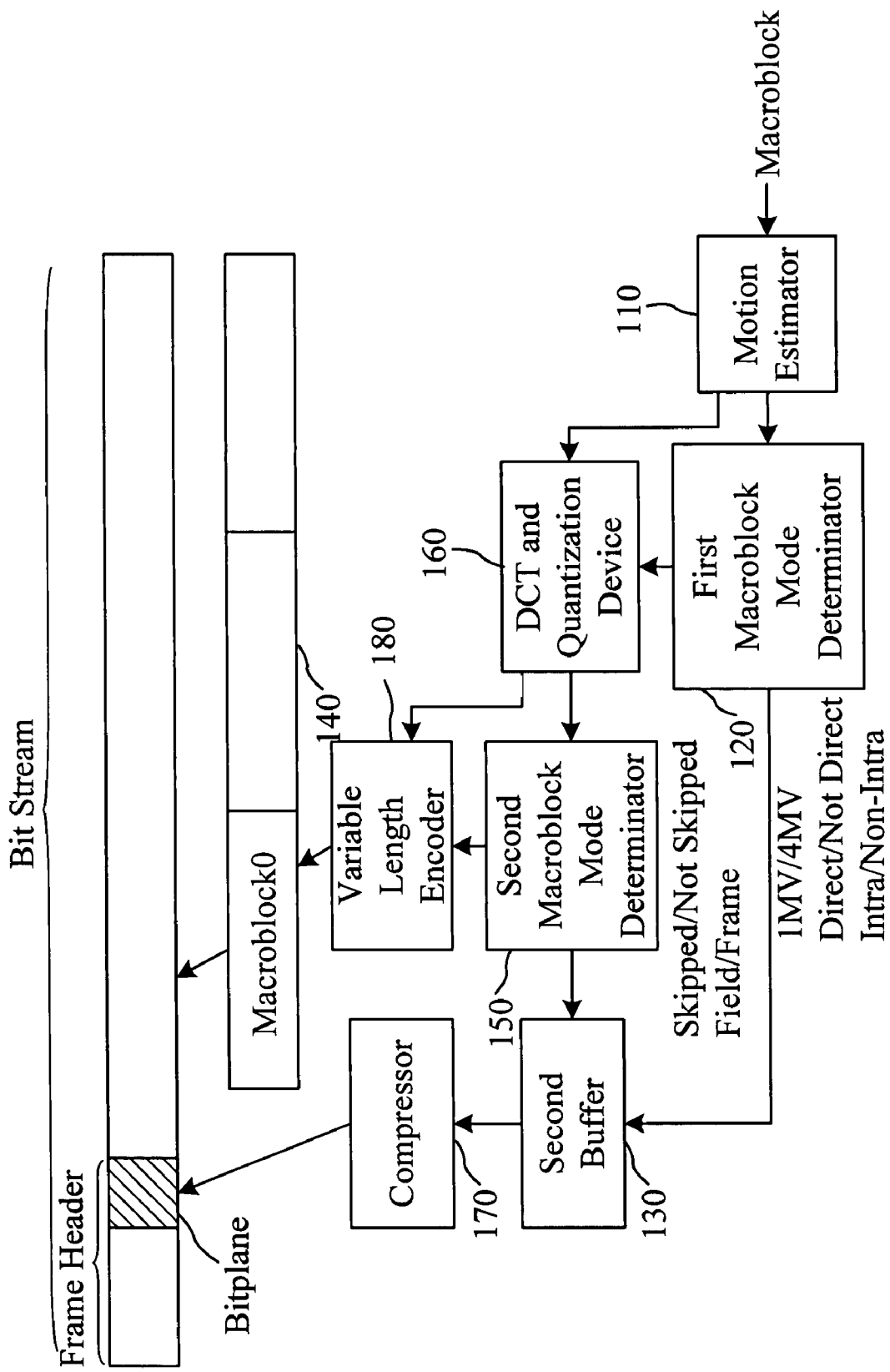
FIG. 1 is a schematic diagram of typical bitplanes of the coding system at compress mode.
Figure 2:
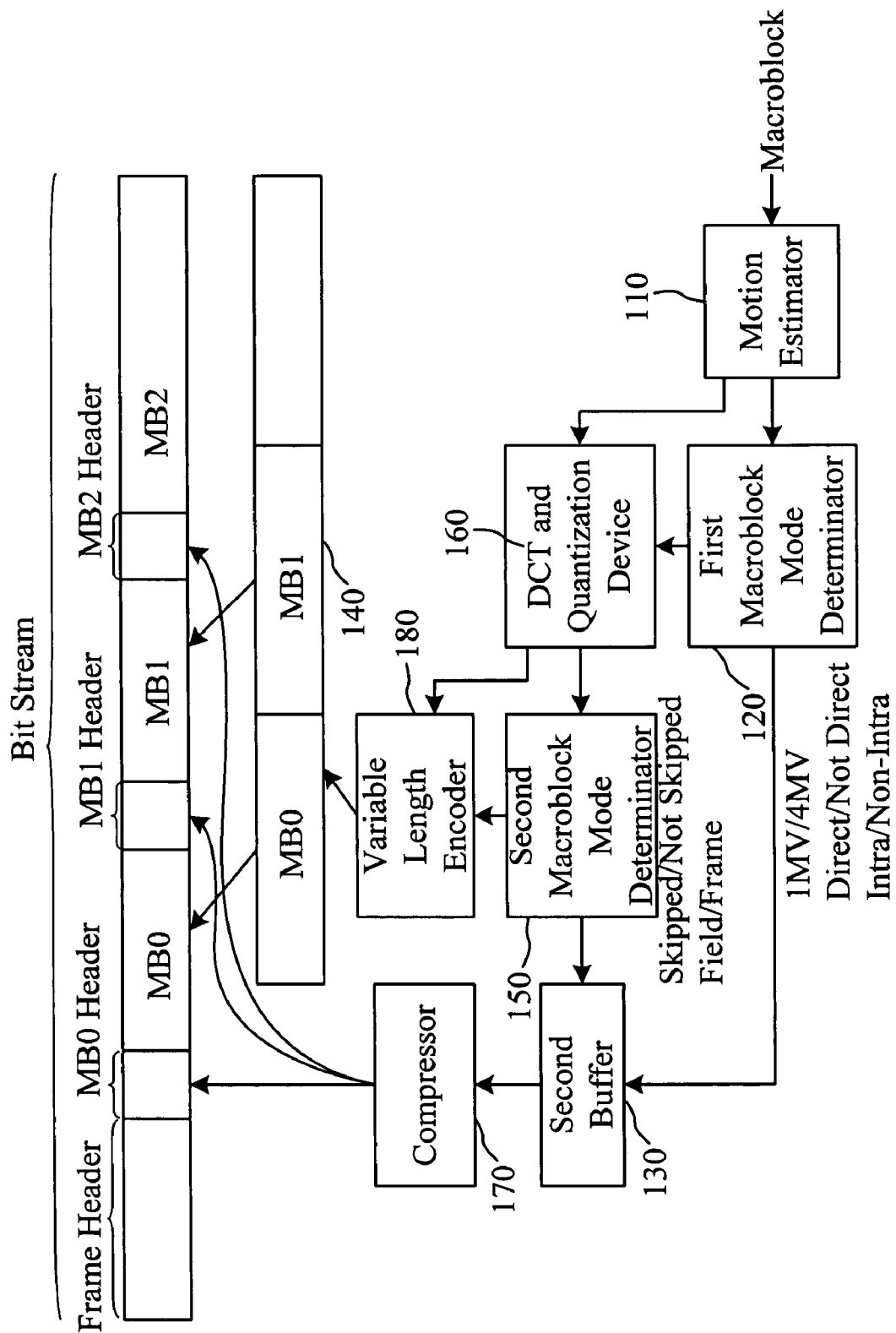
FIG. 2 is a schematic diagram of typical bitplanes of the coding system at raw mode.
Figure 3:
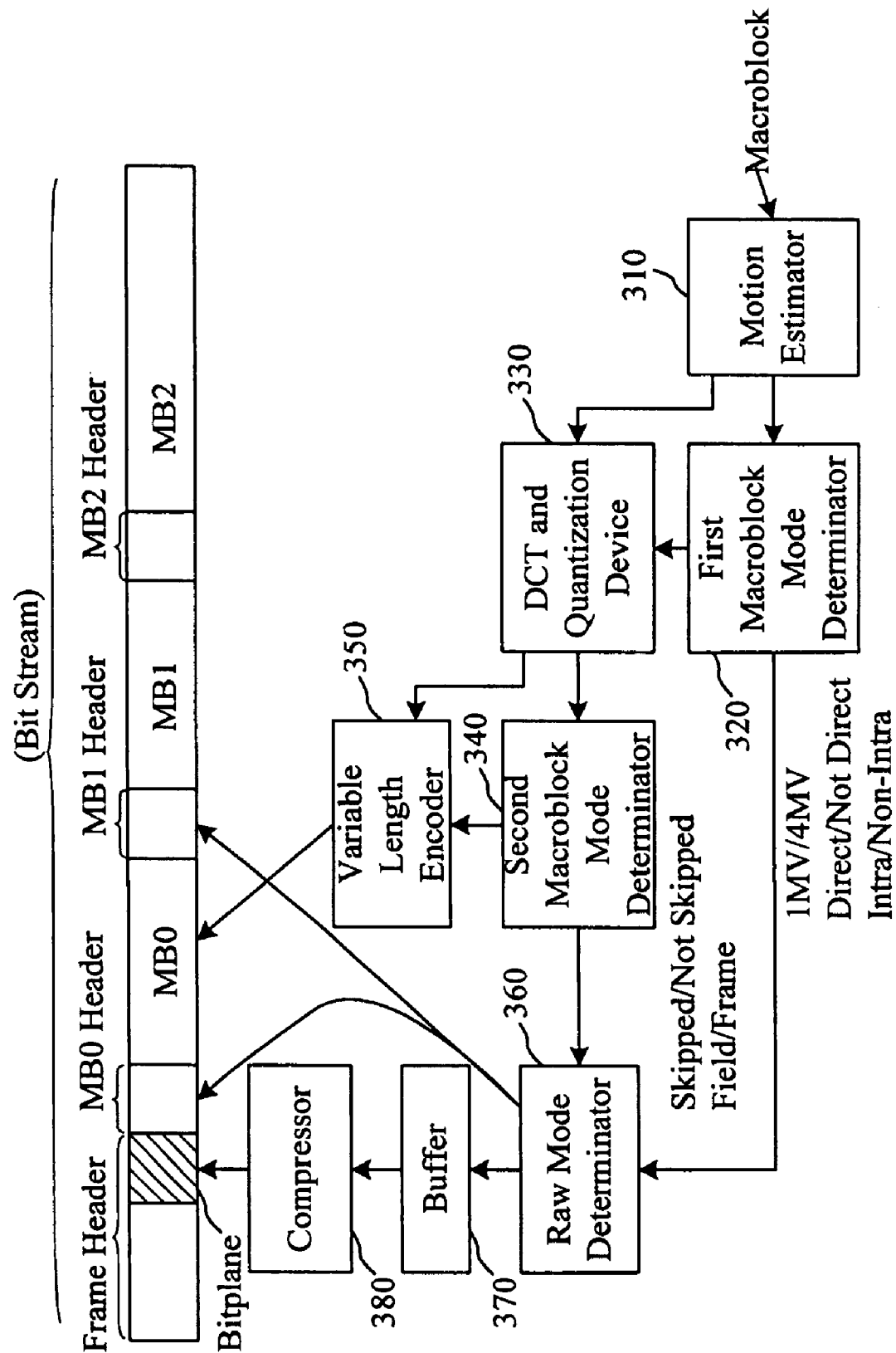
FIG. 3 is a schematic diagram of a coding system with an adaptive bitplane coding mode in accordance with the invention.

FIG. 3 is a schematic diagram of a coding system with an adaptive bitplane coding mode in accordance with the invention. The coding system codes multiple bitplanes of a frame consisting of multiple macroblocks (MBs). Each bitplane consists of macroblock modes used by the macroblocks of the frame. The system includes a motion estimator 310, a first macroblock mode determinator 320, a discrete cosine transform (DCT) and quantization device 330, a second macroblock mode determinator 340, a variable length encoder 350, a raw mode determinator 360, a buffer 370 and a compressor 380.

The motion estimator 310 receives a macroblock for performing a motion estimation, and accordingly produces motion vector (MVs) of the macroblock and corresponding sums of absolute differences (SADs).

The first macroblock mode determinator 320 is connected to the motion estimator 310 in order to determine a macroblock mode of the macroblock in accordance with an output of the motion estimator 310.

When the frame is a P-frame, the motion estimator 310 produces the motion vector 1MV and associated sums of absolute difference $SAD_{1MV}$, and the motion vector 4MV and associated sums of absolute difference $SAD_{4MV}$. The first macroblock mode determinator 320 depends on the data (1MV, $SAD_{1MV}$) and (4MV, $SAD_{4MV}$) to find F1 and F2, where F1=Function (1MV, $SAD_{1MV}$) and F2=Function (4MV, $SAD_{4MV}$). When F1 is smaller than F2, the first macroblock mode determinator 320 determines that the macroblock is of the 1MV mode, and otherwise the 4MV mode.

When the frame is a B-frame, the motion estimator 310 produces a sums of absolute difference $SAD_{Direct}$ at Direct mode and the motion vector $MV_{Not Direct}$ and associated sums of absolute difference $SAD_{Not Direct}$ at Not Direct mode for the macroblock. The first macroblock mode determinator 320 depends on $SAD_{Direct}$, $MV_{Not Direct}$ and $SAD_{Not Direct}$ to find F3 and F4, where F3=Function ($SAD_{Direct}$) and F4=Function ($MV_{Not Direct}$, $SAD_{Not Direct}$). When F3 is smaller than F4, the first macroblock mode determinator 320 determines that the macroblock is of the Direct mode, and otherwise the Not Direct mode.

When the frame is a P- or B-frame, the motion estimator 310 produces a SAD at Non Intra mode and a variance σ at Intra mode for the macroblock. The first macroblock mode determinator 320 depends on the SAD and variance σ to find F5 and F6, where F5=Function (SAD) and F6=Function (σ). When F5 is smaller than F6, the first macroblock mode determinator 320 determines that the macroblock is of the Intra mode, and otherwise the Non Intra mode.

The DCT and quantization device 330 is connected to the motion estimator 310 and the first macroblock mode determinator 320 in order to perform a DCT and quantization on the macroblock after the motion compensation in accordance with an output of the first macroblock mode determinator 320. The DCT and quantization device 330 first performs a discrete cosine transform on the macroblock after the motion compensation. Accordingly, the frequency domain coefficients are obtained. Subsequently, the DCT and quantization device 330 quantizes the frequency domain coefficients by means of a quantization table (not shown) to thereby obtain quantized frequency domain coefficients.

The second macroblock mode determinator 340 is connected to the DCT and quantization device 330 in order to determine the macroblock mode of the macroblock in accordance with the quantized frequency domain coefficients of the DCT and quantization device 330. When a sum of an absolute of the quantized frequency domain coefficients is smaller than a predetermined value, the second macroblock mode determinator 340 determines that the macroblock is of Skipped mode, and otherwise Not Skipped mode. Namely, the second macroblock mode determinator 340 calculates the sum of the absolute of the quantized frequency domain coefficients based on the equation $$F_n = \sum_{i=0}^{N-1} \sum_{j=0}^{N-1} |F_{i,j}|,$$

where the macroblock has a size of N*N, $F_{i,j}$ indicates the quantized frequency domain coefficients, and $F_n$ indicates the sum of the absolute of the quantized frequency domain coefficients.

When the frame is an interlace I-frame, the second macroblock mode determinator 340 selects a Field or Frame mode as the mode of the macroblock.

The variable length encoder 350 is connected to the DCT and quantization device 330 and the second macroblock mode determinator 340 in order to perform a variable length encoding operation on the output of the DCT and quantization device 330 in accordance with the output mode of the second macroblock mode determinator 340 to thereby produce a macroblock bit stream.

The raw mode determinator 360 is connected to the first macroblock mode determinator 320 and the second macroblock mode determinator 340 in order to place bitplane data of each macroblock in a respective macroblock header when the raw mode determinator 360 determines that the bitplane is in a raw mode.

The buffer 370 is connected to the raw mode determinator 360 in order to temporarily store the bitplanes of the macroblocks. The compressor 380 is connected to the buffer 370 in order to compress the bitplanes temporarily stored in the buffer 370. When the raw mode determinator 360 determines that the bitplane is in Compress mode, the compressor 380 performs a variable length encoding operation on the bitplane data of each macroblock to thereby obtain a compressed bitplane, and subsequently places the compressed bitplane in the frame header. The compressor 380 performs a lossless compression on the bitplanes, and the lossless compression can be a variable length encoding (VLE).

Figure 4:
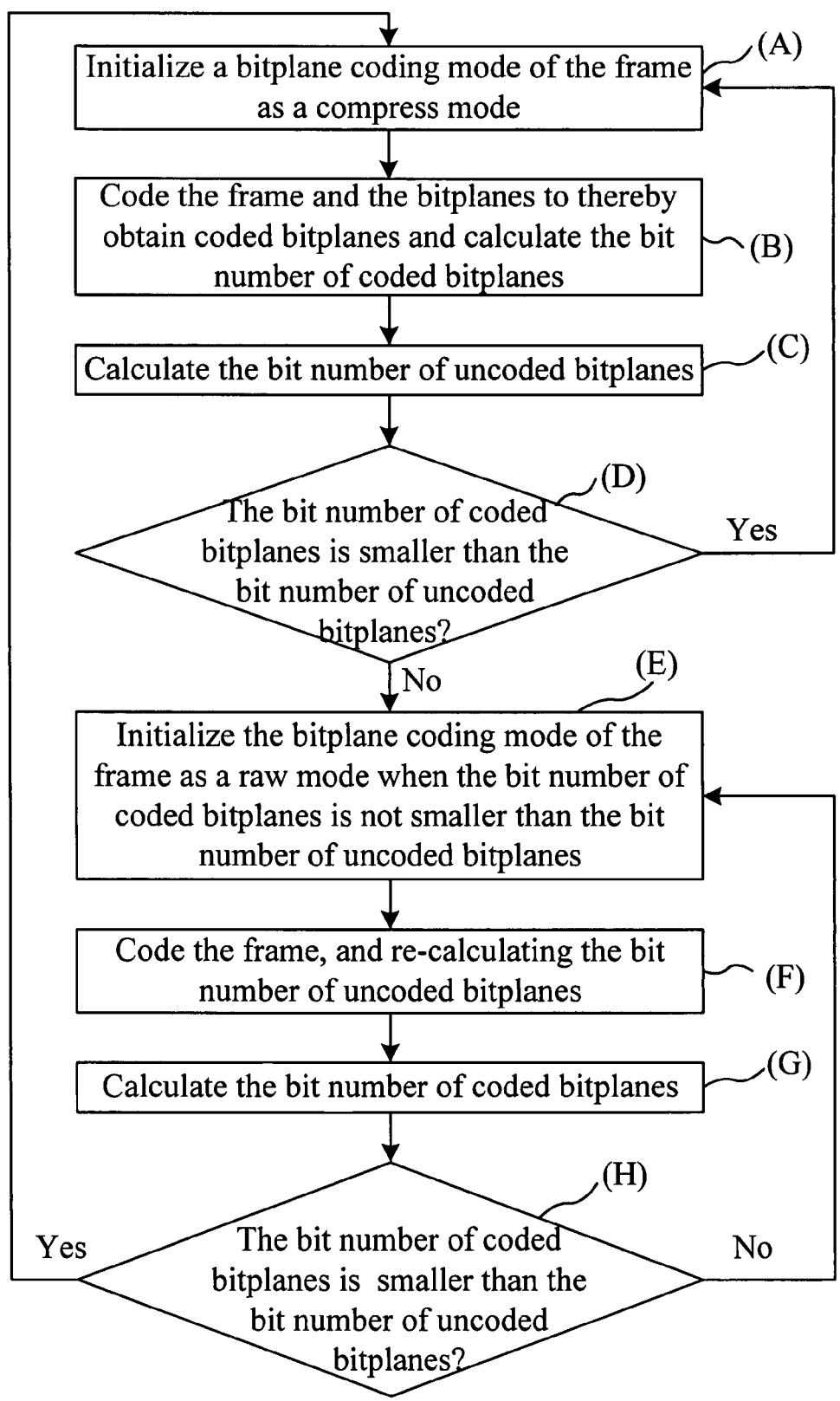
FIG. 4 is a flowchart of a coding method with an adaptive bitplane coding mode in accordance with the invention.

FIG. 4 is a flowchart of a coding method with an adaptive bitplane coding mode in accordance with the invention. The coding method codes multiple bitplanes of a frame consisting of multiple macroblocks, and codes the multiple macroblocks of the frame. Each bitplane consists of macroblock modes used by the macroblocks of the frame.

Step (A) initializes a bitplane coding mode of the frame as a compress mode by setting a parameter raw_mode=0, which indicates to compress the bitplanes to thereby obtain coded bitplanes. Namely, the compressor 380 performs a variable length encoding on the bitplane data of each macroblock and places the compressed bitplane in the frame header of the frame.

Step (B) codes the frame and the bitplanes to thereby obtain coded bitplanes, and calculates the bit number of coded bitplanes. The compressor 380 performs a variable length encoding on the bitplane data of each macroblock and an MPEG coding on the macroblocks of the frame. The coded bitplanes are placed in the frame header of the frame.

Step (C) calculates the bit number of uncoded bitplanes. Step (D) determines whether the bit number of coded bitplanes is smaller than the bit number of uncoded bitplanes. When the bit number of coded bitplanes is smaller than the bit number of uncoded bitplanes, it indicates that the compression effect is achieved after the bitplanes are coded, and thus step (A) is executed to perform the coding operation on the bitplanes of a next frame.

In step (D), when the bit number of coded bitplanes is not smaller than the bit number of uncoded bitplanes, it indicates that the compression effect is not achieved after the bitplanes are coded, and thus step (E) is executed, so as not to perform the coding operation on the bitplanes of a next frame.

Step (E) initializes the bitplane coding mode of the frame as a raw mode by setting a parameter raw_mode=1, which indicates that the compression is not performed on the bitplanes.

Step (F) codes the frame and calculates the bit number of uncoded bitplanes. Step (G) calculates the bit number of coded bitplanes. An uncoded bitplane direct to a bitplane placed in the macroblock header of a macroblock corresponding to the bitplane, and a coded bitplane indicates that an uncoded bitplane is coded by the variable length encoding and placed in the frame header.

Step (H) determines if the bit number of coded bitplanes is smaller than the bit number of uncoded bitplanes. When the bit number of coded bitplanes is not smaller than the bit number of uncoded bitplanes, it indicates that the compression effect is not achieved after the bitplanes are coded, and thus step (E) is executed, so as not to perform the coding operation on the bitplanes of a next frame.

In step (H), when the bit number of coded bitplanes is smaller than the bit number of uncoded bitplanes, it indicates that the compression effect is achieved after the bitplanes are coded, and thus step (A) is executed to perform the coding operation on the bitplanes of a next frame.

In view of the foregoing, it is known that the invention determines to use the raw or compress mode in the bitplane or bitplanes before compressing the entire frame. If the raw mode is used, the macroblock mode of each macroblock is indicated by one bit, which is added in the macroblock head. If the compress mode is used, the macroblocks do not include the data of macroblock modes, but the compressed bitplanes are added in the frame header. After the frame compression is completed, a bitplane coding mode other than the raw mode is determined. Thus, the frame compression is completed by one-pass, which can save the operation time and memory space.

Although the present invention has been explained in relation to its preferred embodiment, it is to be understood that many other possible modifications and variations can be made without departing from the spirit and scope of the invention as hereinafter claimed.

What is claimed is:

1. A coding system with an adaptive bitplane coding mode, which codes multiple bitplanes of a frame consisting of multiple macroblocks, each said bitplane consisting of macroblock modes used by the macroblocks of the frame, the system comprising:

a motion estimator, which receives the macroblock for performing a motion estimation;

a first macroblock mode determinator, which is connected to the motion estimator in order to determine one of the macroblock modes in accordance with the motion estimation;

a discrete cosine transform (DCT) and quantization device, which is connected to the motion estimator and the first macroblock mode determinator in order to perform a DCT and quantization in accordance with an output of the first macroblock mode determinator;

a second macroblock mode determinator, which is connected to the DCT and quantization device in order to determine the macroblock mode of the macroblock in accordance with an output of the DCT and quantization device;

a variable length encoder, which is connected to the DCT and quantization device and the second macroblock mode determinator in order to perform a variable length encoding operation on the output of the DCT and quantization device in accordance with an output mode of the second macroblock mode determinator to thereby produce a bit stream of the macroblock;

a raw mode determinator, which is connected to the first macroblock mode determinator and the second macroblock mode determinator in order to place each of the bitplanes associated with the macroblocks in a respective macroblock header when the bitplane of the frame is in a raw mode;

a buffer, which is connected to the raw mode determinator in order to temporarily store the bitplane consisting of the macroblock modes used by the macroblock; and a compressor, which is connected to the buffer in order to compress the bitplane temporarily stored in the buffer;

wherein the compressor performs a compression on the bitplane of the macroblocks when the bitplane of the frame is in a compress mode, and places the bitplane encoded in a frame header of the frame.

2. The system as claimed in claim 1, wherein the compressor performs a lossless compression on the bitplane.

3. The system as claimed in claim 2, wherein the lossless compression is a variable length encoding.

4. The system as claimed in claim 1, wherein the first macroblock mode determinator selects a 1 MV mode or a 4 MV mode as the macroblock mode when the frame is a P-frame.

5. The system as claimed in claim 1, wherein the first macroblock mode determinator selects a Direct mode or a Not Direct mode as the macroblock mode when the frame is a B-frame.

6. The system as claimed in claim 1, wherein the first macroblock mode determinator selects an Intra mode or a Non Intra mode as the macroblock mode when the frame is an I-frame.

7. The system as claimed in claim 1, wherein the second macroblock mode determinator selects a Skipped mode or a Not Skipped mode as the macroblock mode when the frame is a P-frame.

8. The system as claimed in claim 1, wherein the second macroblock mode determinator selects a Field mode or a Frame mode as the macroblock mode when the frame is an interlace I-frame.

9. A coding method with a bitplane coding mode, which codes multiple bitplanes of a frame consisting of multiple macroblocks, each said bitplane consisting of macroblock modes used by the macroblocks of the frame, the method comprising the steps:

(A) initializing the bitplane coding mode of the frame as a compress mode;

(B) coding the frame and the bitplanes to thereby obtain coded bitplanes, and calculating bit number of the coded bitplanes;

(C) calculating bit number of original uncoded bitplanes;

(D) executing step (A) when the bit number of the coded bitplanes is smaller than the bit number of the uncoded bitplanes;

(E) initializing the bitplane coding mode of the frame as a raw mode when the bit number of the coded bitplanes is not smaller than the bit number of the uncoded bitplanes;

(F) coding the frame, and then calculating the bit number of uncoded bitplanes;

(G) calculating the bit number of coded bitplanes; and (H) executing step (E) when the bit number of the coded bitplanes is not smaller than the bit number of the uncoded bitplanes after coding the frame.

10. The method as claimed in claim 9, wherein step (H) further executes step (A) with a next frame when the bit number of the coded bitplanes is smaller than the bit number of the uncoded bitplanes.

11. The method as claimed in claim 9, wherein the coded bitplanes in step (B) are placed in a frame header of the frame.

12. The method as claimed in claim 9, wherein the uncoded bitplanes are placed correspondingly in macroblock headers of the macroblocks from the frame.

* * * * *